Sept. 8, 1970 L. A. NELSON 3,527,634

TAPE APPLICATOR FOR APPLYING TAPE ACROSS COVER AND BODY OF A CONTAINER

Filed Dec. 29, 1966 5 Sheets-Sheet 1

INVENTOR.
LLOYD A. NELSON

BY

Townsend & Townsend

ATTORNEYS

INVENTOR.
LLOYD A. NELSON
BY
Townsend & Townsend
ATTORNEYS

Sept. 8, 1970 L. A. NELSON 3,527,634

TAPE APPLICATOR FOR APPLYING TAPE ACROSS COVER AND BODY OF A CONTAINER

Filed Dec. 29, 1966 5 Sheets-Sheet 3

INVENTOR.
LLOYD A. NELSON

BY

Townsend & Townsend

ATTORNEYS

INVENTOR.
LLOYD A. NELSON
BY
Townsend & Townsend
ATTORNEYS

INVENTOR.
LLOYD A. NELSON
BY
Townsend & Townsend
ATTORNEYS

United States Patent Office 3,527,634 Patented Sept. 8, 1970

3,527,634
TAPE APPLICATOR FOR APPLYING TAPE ACROSS COVER AND BODY OF A CONTAINER

Lloyd A. Nelson, Fremont, Mich., assignor to Gerber Products Company, Fremont, Mich.

Filed Dec. 29, 1966, Ser. No. 606,508
Int. Cl. B65h 25/12
U.S. Cl. 156—361 7 Claims

ABSTRACT OF THE DISCLOSURE

A device for applying a segment of pressure sensitive adhesive tape across the cover and body portion of a reclosable food container as the containers are advanced along a path. The tape is simultaneously advanced along a transverse path so that each container rolls across the tape. The path is provided with a raised area complementary to at least a portion of the contour of the container. In one embodiment the tape is advanced into the path by drawing upon the backing strip adhesively secured to the tape.

This invention relates to a machine for the application of tape to the lid of a conventional resealable container.

In the preferred embodiment, the invention is practiced by first sealing a reclosable cover onto a container in an improved manner. A strip of permanent type pressure sensitive tape is then applied across the edge or rim of the reclosable cover and then downwardly to join the body of the container. The lower extremity of the tape is subsequently covered with a product identification label which encircles the container.

The purpose of applying the tape is to visually interconnect the movable reclosable cover to the body or fixed portion of the container on which the cover may be turned in a twist-off motion. The tape should, therefore, be of a quality to effect permanent application, so that if a reclosable cover is turned slightly the tape will rupture. Alternatively, if an attempt is made to peel the tape from the cover, the paper label will delaminate or sever and thus provide a visual indication of the possibility that such has happened.

This technique of visually interconnecting the reclosable cover and container body can be by application of a single tape strip extending to join the cover to the container body sidewall, the tape extending downwardly and assuming the configuration of a reclosable cover and container and terminating under a product identification label encircling the container. Another form can be essentially the same except that two tapes may be applied approximately opposite or at 180° from each other on the periphery of the cover end of the container.

Throughout this disclosure the container can be assumed to be a glass baby food jar with a twist-off reclosable cover; however, this is for illustrative purposes only and not limited to only this container or product. In general practice, foods sealed with heat sterilization methods contain a vacuum. Also in general practice, reclosable (twist-off) covers for baby foods will contain a panel with a stretched area which acts as a diaphragm or "flip panel." When a vacuum is sealed within the container, the "flip panel" will be drawn inwardly and said reclosable cover will maintain a high resonance due to the "flip panel" being held in tension by the inward vacuum.

When the reclosable cover is moved, as when opening, the vacuum is released; this allows air to enter the container with a resounding "pop" noise. The "flip panel" will spring outwardly into its original shape, and since it is no longer under vacuum tension, the resonance will be low or resound as a "dud."

On these "flip panel" type reclosable covers, tapes applied in accordance with this invention will provide a secondary or visual type indicator of tampering.

It is a principal object of this invention to provide a resealable-type food container which includes a secondary visual indication of the prior removal of the container cover.

It is a further object of this invention to provide a machine for the continuous application of at least one strip of fracturable adhesive tape across the cover and body portion of a resealable food container.

It is a feature and advantage of this invention to provide a tape application device which can be attached to the front end of a conventional labeling apparatus without interrupting or diminishing the rate of label application.

It is another feature and advantage of this invention to provide a machine which will automatically position a predetermined length of tape for application between the cover and the body portion on a resealable container surface.

It is a still further feature and advantage of this invention to provide a tape application device which will utilize the resealable container cover to sever a strip of fracturable adhesive tape as the tape is being simultaneously applied to a predetermined position on the surface of the resealable container.

It is another feature and advantage of this invention to provide a tape applicator in which the pulling force which removes a backing strip from the fracturable adhesive tape also positions the tape for application to the resealable food container.

Another feature and advantage of this invention is to provide a tape applicator wherein a depleted roll of fracturable tape will be automatically replaced by a new roll.

These objects, features and advantages will be better understood and others will become apparent when reference is made to the following disclosure, especially in view of the attached drawings wherein.

Figure 1:
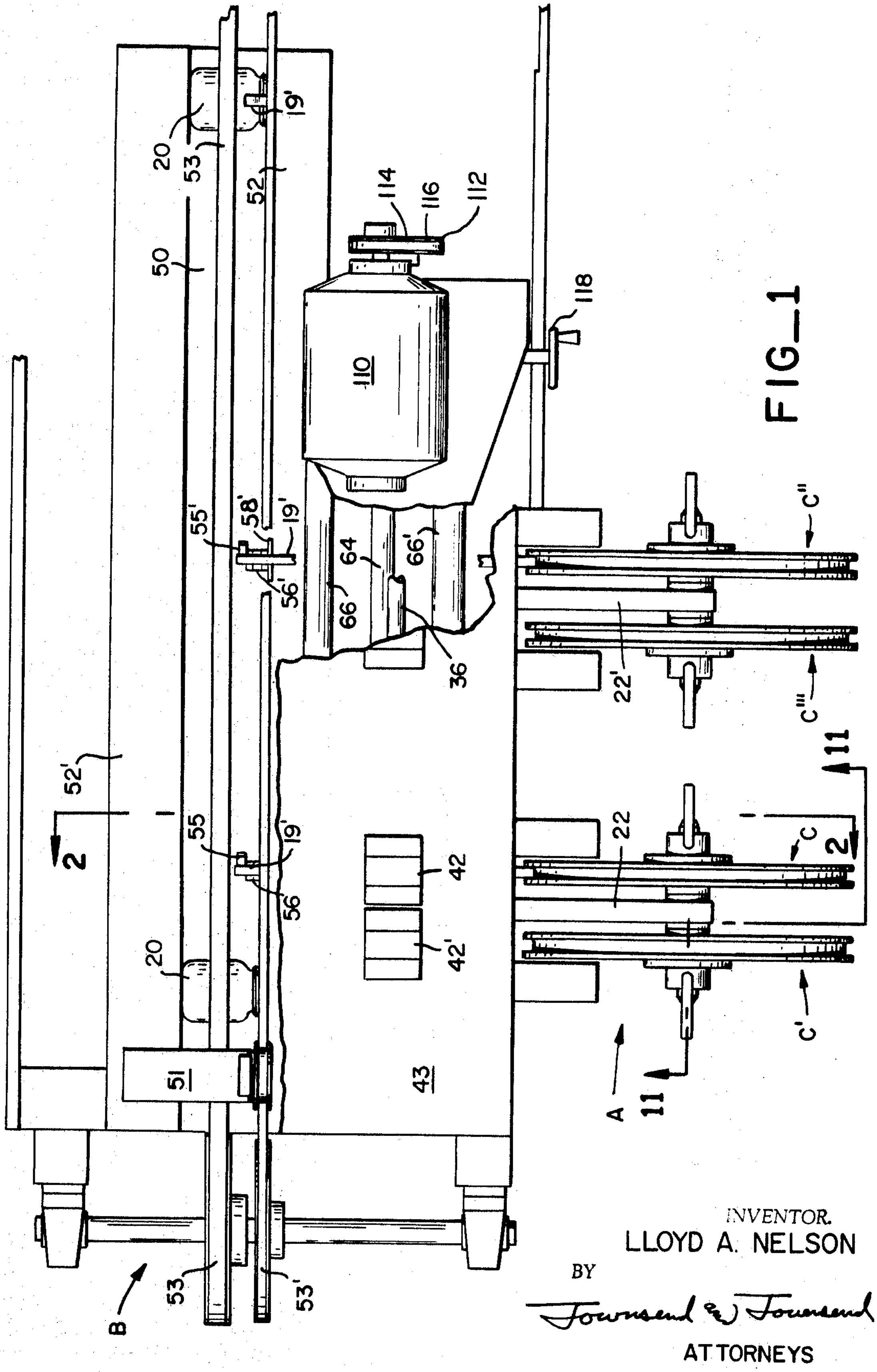
FIG. 1 is a top plan view, partially cut away, of an embodiment of this invention.

The present invention is directed to a machine for applying a segment of pressure-sensitive adhesive tape across the cover and body portion of a reclosable food container which for present purposes may be assumed to be a glass jar suitable for packing baby food. Of course, it will be understood that the invention is useful with other types of containers. Furthermore, although the application of a single tape segment produces the desired visual indication of previous lid removal, it is preferred that at least two segments of tape be spaced at intervals around the periphery of the container as a further assurance to the consumer that the container has not previously been opened. Therefore, the following specific embodiment as set forth in the specification and drawings is directed to a double-tape segment application.

The machine of this invention is useful in conjunction with commercially available labeling devices such as, for example, a Standard-Knapp roll-on label machine which is conventionally employed to continuously apply a flat rectangular sheet about the periphery of a glass jar. Since such a machine is well-known in this art, no details thereof are herein illustrated or described.

The device of this invention is employed to apply fracturable tape to a jar and lid thereon in spanning relation to the junction between the jar and the lid. This is accomplished by rolling the jar along a path transversely of which is positioned a segment of pressure-sensitive adhesive tape with the adhesive surface exposed to the jar so that as the jar rolls over the tape, the tape will adhere to the jar.

In one form of the invention, tape provided with a protective backing strip is employed. Such backing strip is utilized in automatically positioning the tape in the jar path. The tape wth backing strip attached is conveyed toward the jar path in a direction normal thereto. Adjacent a lateral extremity of the path, the backing strip is drawn obliquely of the path and of the tape, whereupon the tape is advanced into the desired position across the jar path. Laterally adjacent the jar path a guide member is provided and is so constructed that as the tape is drawn over the guide member, the tape is separated from the backing strip and is fed into the jar path. Mechanism for controllably advancing the backing strip is provided in accordance with the present invention.

Within the tape path and in alignment with the tape guide, a die-like block is mounted for uniformly pressing the tape onto the jar and lid. The die-like block so functions because it has a surface corresponding with the silhouette of the jar and lid.

The jar lying on its side with its lid towards the tape guide is rolled along a runway under the pressure exerted by a pulley and an endless belt aligned with and overlying the path. The jar passes over the tape supported on the die-like block and is pressed down against the upwardly positioned adhesive surface of the tape. A tape segment is thus firmly, adhesively applied to the jar and lid in conformity therewith. A stationary knife surface is provided which in cooperation with the lid severs the tape segment at the lid, thereby permitting the jar to proceed along the path without interference.

After the jar has rolled through another one and a half revolutions, a similar tape application is repeated to apply a second segment of pressure-sensitive adhesive tape approximately 180° around the periphery from the location of the initial tape segment. As the jars continue along the defined path of the conveyor, additional pressure application can be utilized to increase the adhesion of the tape to the jar surface.

In another aspect of the invention, the segments of tape are preferably applied in a sufficient length so that the aforementioned conventional label, disposed around the periphery of the container body, will overlap the lower end of the tape. This overlap additionally insures that should the tape be removed, its removal will destroy a visibly perceptible portion of the label, thereby alerting the consumer to any prior tampering.

Referring now to the drawings wherein similar characters of reference represent corresponding parts in each of the several views, there is shown a tape applicator A mounted for reciprocal movement, as hereinafter described, along jar conveyor B.

Tape applicator A includes four tape positioning units C, C′, C″ and C‴, each of which, when properly positioned as hereinafter described, is capable of feeding tape, in predetermined increments, into position over jar conveyor B normal to the path along which jars 20, having conventional metallic lids 21, are rolled. Although tape applicator A of this invention is intended to process jars at regular labeling speeds, the remainder of this disclosure will be primarily directed to the application of pressure-sensitive adhesive tape to a single jar 20. Furthermore, for purposes of clarity, tape-positioning unit C will be first described in detail and then the relative relationship between the operation of unit C and units C′, C″ and C‴ will be further explained.

Figure 2:
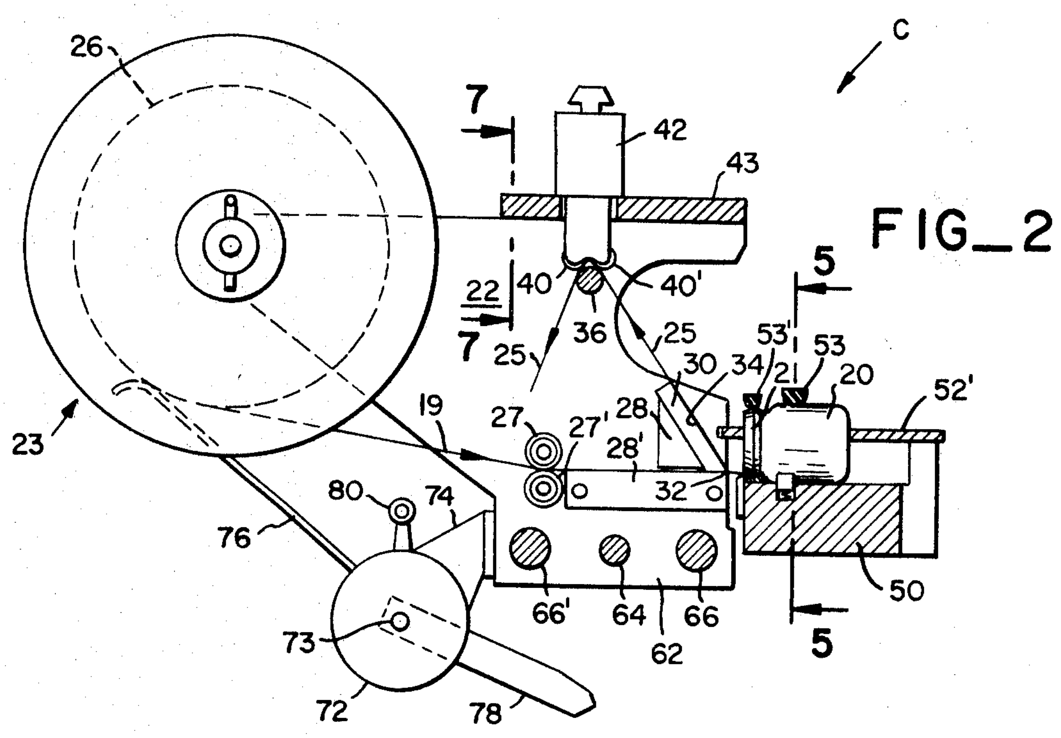
FIG. 2 is a fragmentary vertical sectional view including a substantially full spool of tape and taken substantially along the line 2—2 of FIG. 1.
Figure 3:
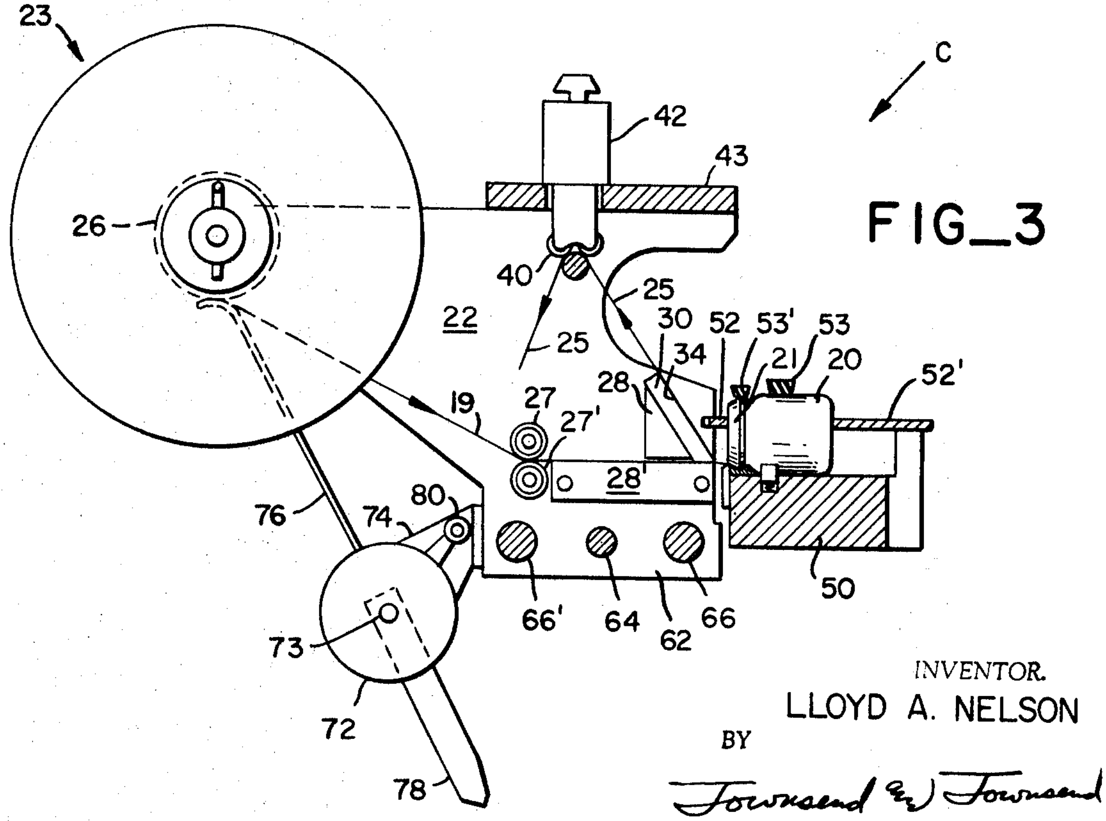
FIG. 3 is a fragmentary vertical sectional view similar to FIG. 2 and illustrating a depleted spool of tape.

Referring first to FIGS. 2 and 3, tape-positioning unit C is attached to one side of vertical frame member 22 and includes tape roll holder 23, to be described in greater detail hereinafter when reference is made to FIG. 11. Tape 19, including backing strip 25, is stored in spool 26 which is rotatably mounted on holder 23. In operation, tape 19 and backing strip 25 are threaded from spool 26 between upper and lower rotatable guide members 27 and 27′, respectively; between upper and lower stationary guide means 28 and 28′, respectively; and under the lower surface of a peel bar 30, which has a width corresponding to the width of tape 19. Peel bar 30 is formed with a lower end breaking edge 32 for separating tape 19 from backing strip 25 when the latter is drawn thereover and rearwardly along upper edge 34 of peel bar 30. Peel bar 30 is preferably fabricated so that backing strip 25 is drawn away from tape 19 at an obtuse angle to the continuation of the path formed by guide members 27, 27′, 28 and 28′. In this manner, tape 19 continues along an extension of the path and over runway 50.

Figure 7:
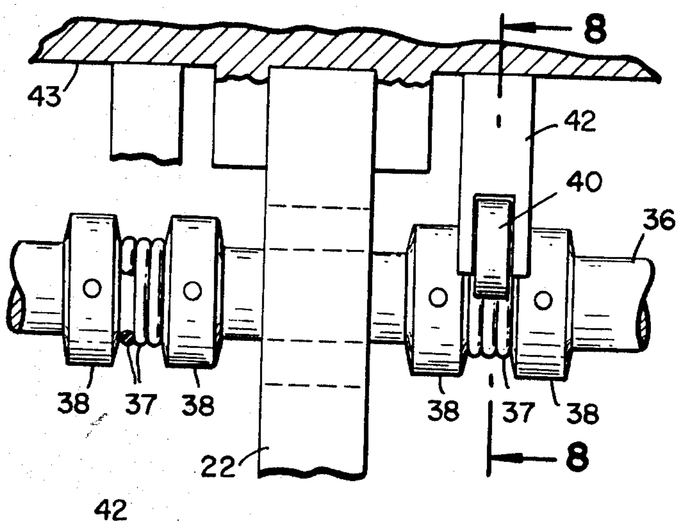
FIG. 7 is an enlarged fragmentary vertical sectional view taken along the line 7—7 of FIG. 2.
Figure 8A:
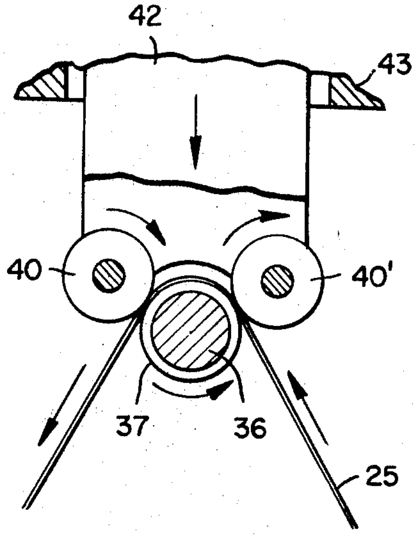
FIGS. 8 and 8A are enlarged fragmentary side sectional views taken along line 8—8 of FIG. 7 and illustrating the control of tape advancement.
Figure 8B:
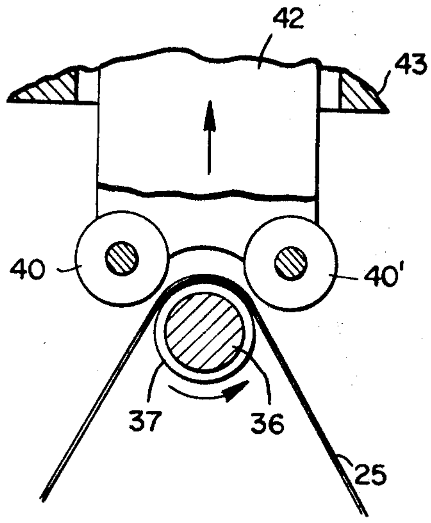

As more clearly shown in FIGS. 7, 8A and 8B, backing strip 25 is passed upwardly and rearwardly over variable speed drive shaft 36 that is provided with a plurality of O-rings 37 for establishing frictional engagement between the backing strip and the drive shaft. A pair of spaced-apart collars 38 is provided for maintaining backing strip 25 in alignment with O-rings 37. Solenoid operated pressure rollers 40 and 40′, located above shaft 36, are responsive to solenoid 42. When solenoid 42 is activated, as hereinafter described, rollers 40 and 40′ are advanced, as illustrated in FIG. 8A, to engage backing strip 25 while straddling shaft 36 between collars 38. Thus backing strip 25 is driven by rotation of shaft 36 when solenoid 42 is activated thereby causing backing strip 25 to be drawn forward.

When rollers 40 and 40′ are raised out of contact with shaft 36 by deactivating solenoid 42, as depicted in FIG. 8B, backing strip 25 is released from frictional contact against O-rings 37 and therefore, continued rotation of shaft 36 does not cause further advancement of backing strip 25.

Figure 4A:
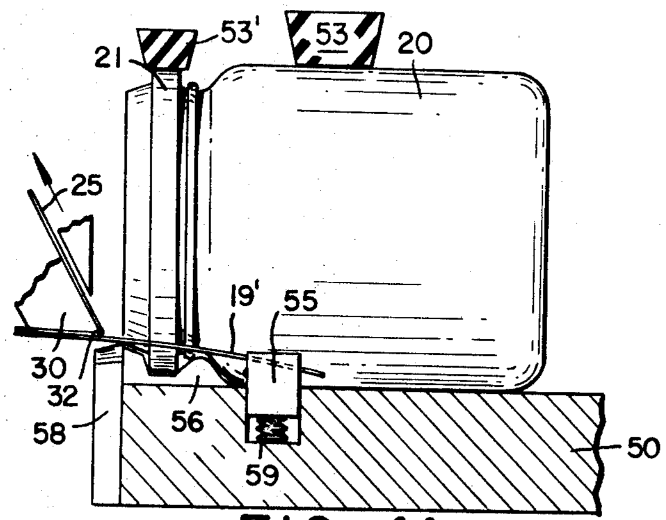
FIGS. 4A, 4B and 4C are enlarged schematic illustrations of the present embodiment illustrating in series the application of tape to a rolling glass jar.
Figure 4B:
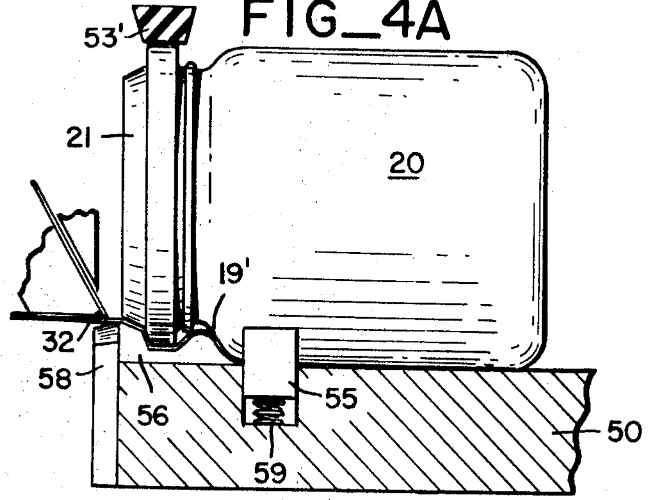
Figure 4C:
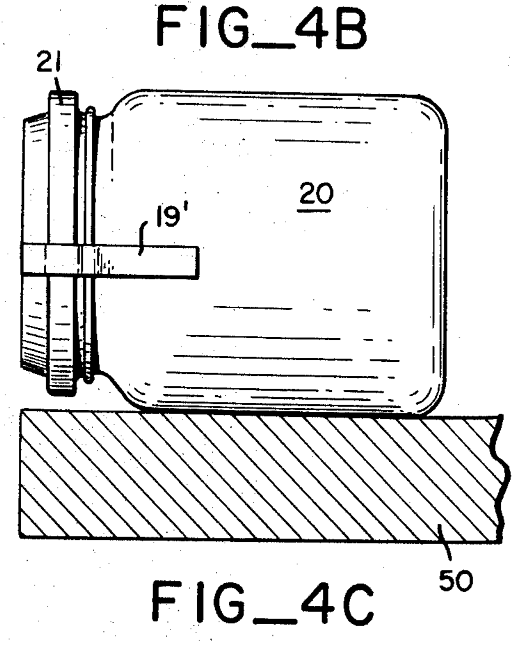

When backing strip 25 advances in response to rotation of shaft 36, tape 19 separates from backing strip 25 at breaking edge 32. Referring to FIGS. 4A, 4B and 4C, tape segment 19′, of a length corresponding to that portion of backing strip 25 which is drawn between shaft 36 and rollers 40 and 40′, is extended substantially horizontally outwardly from edge 32. As will be obvious to one skilled in this art, control of the frictional contact of backing strip 25 between shaft 36 and rollers 40 and 40′, through regulation of solenoid 42, determines the length of adhesive tape segment 19′ which is advanced outwardly from breaking edge 32. Solenoid 42, mounted through horizontal frame member 43, is energized in response to passage of a jar by a signal received from proximity switch 60, shown most clearly in FIG. 9. Proximity switch 60 includes a conventional electromagnetic sensing element that responds to passage of a jar.

Jar-conveying assembly B includes runway 50 having front and rear guide rails 52 and 52', respectively, which are spaced above the runway to correspond to the height of the particular jar being treated. Tape applicator A is mounted, as hereinafter described with reference to FIGS. 9 and 10, for reciprocal slidable movement with respect to jar-conveying assembly B and adjacent front guide rail 52. Jar 20 is conveyed along runway 50 by the pressure exerted through endless pulley belt 53. Pulley belt 53' is positioned to exert pressure on lid 21. Conventional tensioning devices, such as weight 51, can be employed to intensify the pressure exerted by belt 53'. Other conventional tensioning devices (not shown) can be employed in cooperation with belt 53 in a similar manner. Tape applicator A and jar-conveying assembly B are disposed so that the directional movement of jar 20 along runway 50 is substantially perpendicular to the direction of advancement of tape segment 19' from breaking edge 32.

Figure 5:
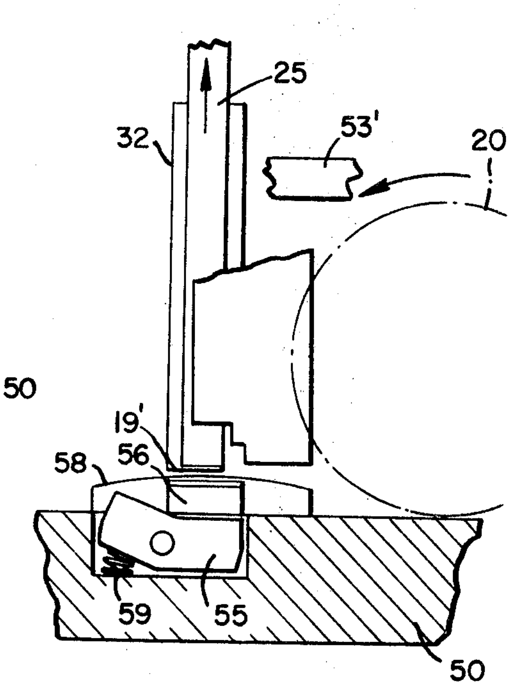
FIG. 5 is an enlarged fragmentary vertical sectional view taken along the line 5—5 of FIG. 2.
Figure 6:
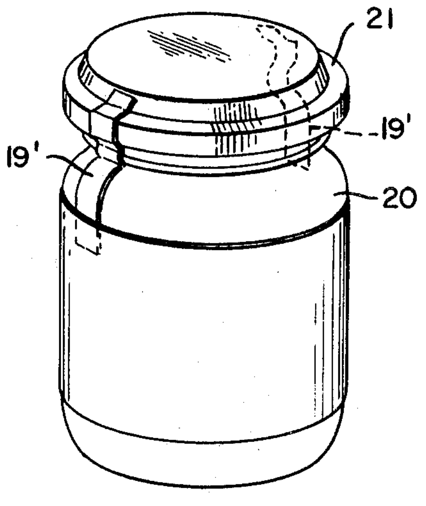
FIG. 6 is a perspective view of a resealable jar to which has been applied a pair of tape strips in accordance with this invention.

Attached to runway 50 is forming block 56 molded of a suitable material such as soft rubber. As depicted most clearly in FIG. 4A, block 56 is preferably formed with a configuration which corresponds to the silhouette of lid 21 and the neck portion of jar 20. Block 56 is aligned so that when tape segment 19' advances horizontally in response to the pulling force applied to backing strip 25, tape segment 19' is positioned directly above and aligned with block 56. As shown in FIG. 5, stop means 55 is pivotally mounted in runway 50 in lateral alignment with block 56 to insure that tape segment 19' will be maintained parallel with and directly over mold block 56.

Attached to the side of runway 50 and also aligned with block 56 is a knife 58. Knife 58 is positioned to extend above runway 50 to define in cooperation with lid 21 tape shears which sever tape segment 19' as jar 20 rolls across block 56. In this manner, and as is most clearly shown sequentially in FIGS. 4A, 4B, and 4C, pressure-sensitive tape segment 19' with its adhesive surface facing up, adheres to jar 20 and lid 21 as jar 20 rolls across block 56. Simultaneously therewith, knife 58 cooperates with lid 21 to sever that portion of tape segment 19' which extends beyond knife 58 over block 56. Pulley belt 53' is aligned directly over knife 58 and block 56 to maintain severing contact between lid 21 and knife 58. As jar 21 continues along runway 50, stop means 55 is depressed against spring 59 and is pivotally displaced by jar 20. When jar 20 has rolled beyond stop means 55, stop means 55 will return to its normal position to act as a guide for the next portion of advancing tape (not shown). Secondary compression means (not shown) are located further along runway 50 to insure that tape segment 19' are firmly secured to jar 20.

Figure 9:
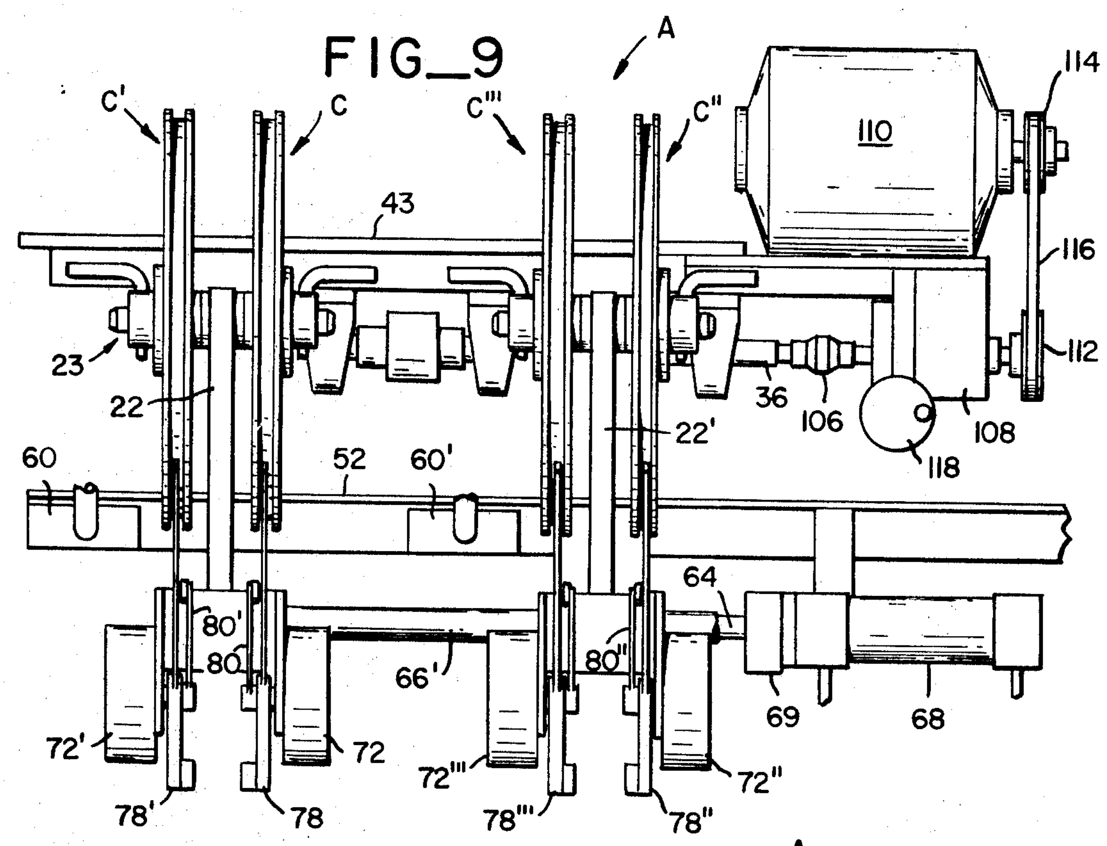
FIGS. 9 and 10 are fragmentary side elevational views of the embodiment of this invention in a first and second spool holder position.

As illustrated in FIG. 9, proximity switch 60 is disposed in advance (upstream) of block 56, and, in a conventional manner such as magnetically, indicates the passage of additional jars 20 along runway 50. As each jar 20 passes, switch 60 senses metal lid 21 and actuates solenoid 42 causing rollers 40 and 40' to engage shaft 36. In this manner, the passage of each jar 20 across sensing switch 60 causes an advance of backing strip 25 between rollers 40, 40' and shaft 36 to position another tape strip (not shown) over block 56.

Referring again to FIGS. 2 and 3, the tape applicator is supported on slide bracket 62 integral with vertical frame member 22 and mounted on bar 64. Slide bracket 62 is slidably disposed on a pair of parallel bars 66 and 66'. As is most clearly shown in FIGS. 9 and 10, bar 64 is secured at one end to pneumatically-operated cylinder 68, having spring offset valving in one direction and solenoid valving in the opposite direction. A solenoid valve 69 is provided for controlling cylinder 68 so that when the valve is actuated, as hereinafter described, cylinder 68 draws tape applicator A downstream along jar conveyor B. Thus, tape-positioning unit C is drawn out of alignment with forming block 56 on runway 50.

Tape-positioning unit C includes microswitch 72 which activates solenoid valve 69. Microswitch 72 is freely rotatable upon axis 73 of support 74 which is secured to the lower portion of vertical frame member 22. Attached to microswitch 72 is follower arm 76, counterweight 78 and actuating arm 80 all of which revolve as a unit about axis 73.

Follower arm 76 is continuously urged into contact with tape 19 on spool 26 by the opposing weight of counterweight 78. As spool 26 is depleted, its diameter will be reduced and as a result thereof follower arm 76 as well as microswitch 72 and actuating arm 80 will be forced by counterweight 78 to rotate around axis 73 (as shown in FIG. 3). While the diameter of spool 26 is decreasing, actuating arm 80 is rotating into abutting contact with support 74 and is prevented from further rotational movement. However, as spool 26 continues to decrease in size, the weight of counterweight 78, which is sufficient to overcome the resistance of actuating arm 80, continues to rotate follower arm 76 and microswitch 72 as well as counterweight 78 about axis 73. When spool 26 reaches a predetermined minimum diameter, the position of follower arm 76 causes actuating arm 80 to be tripped, thereby energizing microswitch 72.

Figure 10:
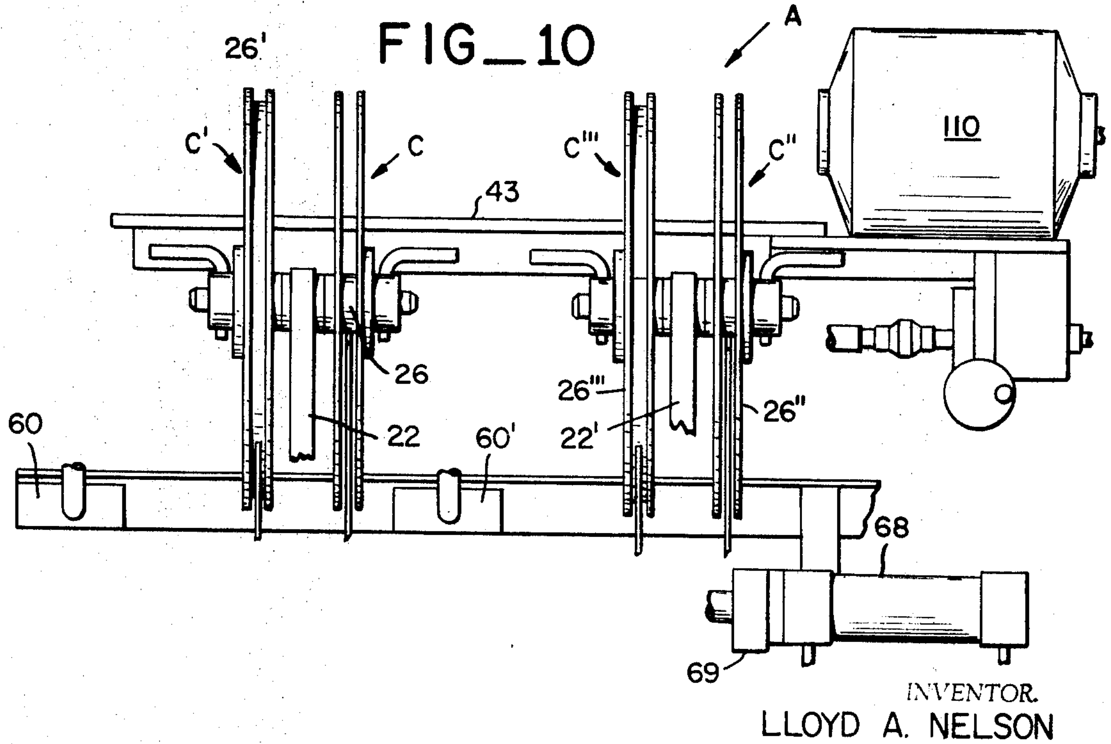

As most clearly shown in FIGS. 9 and 10, the activation of microswtich 72 in turn activates solenoid valve 69 and causes pneumatic cylinder 68 to draw tape applicator A along bars 66 and 66' from a first position illustrated in FIG. 9 to a second position as shown in FIG. 10.

In this manner, tape-positioning means C', mounted on the opposite side of vertical frame member 22, is aligned with mold 56 and knife 58. As will be apparent to one skilled in this art, the distance that tape applicator A is shifted will preferably correspond to the distance between the center lines of spools 26 and 26'. When this switch-overover occurs, solenoid 42 is deactivated and solenoid 42' is activated, thereby continuously feeding further tape strips (not shown) across the path of additional jars (not shown). Tape-positioning means C' is then aligned with block 56, knife 58 and stop 55 on runway 50 and functions in an identical manner to tape-positioning means C.

Tape applicator A is constructed so that tape-positioning units C'' and C''' are disposed further along (downstream) runway 50, for example, about one and one-half times the circumference of jar 20. Thus, a second tape strip will be applied to jar 20 opposite the first tape strip. Tape-positioning unit C'' operates in an identical manner to tape-positioning unit C and feeds this second tape strip (not shown) to be attached to jar 20. Thus when tape-positioning unit C is activated, jar-conveying assembly C'' is aligned with block 56', knife 58' and stop 55' spaced downstream on runway 50 and also activated. Of course, when tape applicator A is shifted by cylinder 68, tape-positioning unit C''' will be aligned with block 56', knife 58' and stop 55' on runway 50.

When either actuating arm 80 or 80'' is tripped on tape-positioning unit C or C'', microswitch 72 or 72'', respectively, is energized and solenoid 69 activated, causing pneumatic cylinder 68 to draw tape applicator A forward the distance required to align tape-positioning units C' and C''' with blocks 56 and 56', respectively. Similarly, when the spool of tape on either tape-positioning unit C' or C''' is depleted, the respective actuating arm will energize the corresponding microswitch 80'' or 80''', respectively, thereby deactivating solenoid 69 and releasing the pneumatic pressure of cylinder 68. Cylinder 68, which is spring activated when solenoid 69 is deactivated, causes tape applicator A to assume its original position. In this manner tape will again be fed from tape-positioning unit C and C'' to which have been attached new tape spools.

Thus the depletion of tape 19 on either spool 26 or 26'' will not necessitate a stoppage of tape application in order to manually replace the tape spools. Tape spools 26 and 26″ are manually replaced while tape is being dispensed from spools 26′ and 26‴, respectively. While tape-positioning unit C′ or C‴ are supplying tape strips 19′, the energizing of either microswitch 72′ or 72‴ will deactivate solenoid 69. The spring offset valving in cylinder 68 will force tape applicator A back to its original position as illustrated in FIG. 9. In this manner, a pair of tape strips 19′ are continuously disposed for application to the surface of jar 20 through tape-positioning units C and C″ or alternately from C′ and C‴.

Figure 11:
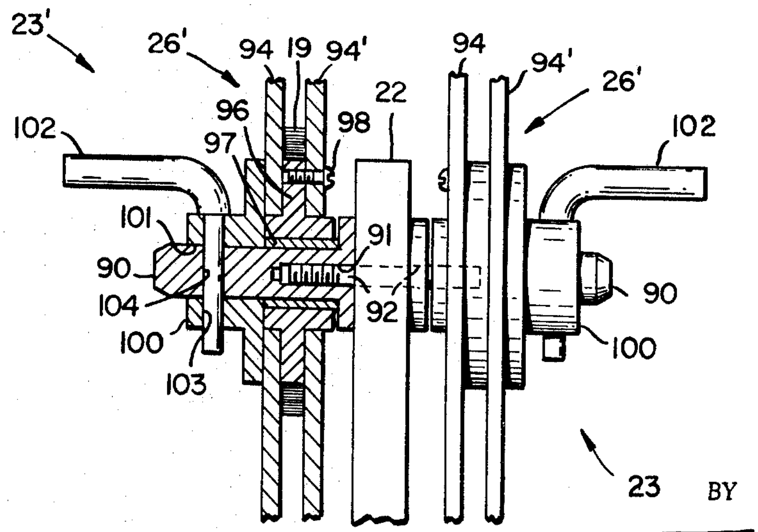
FIG. 11 is an enlarged fragmentary partial vertical sectional view of the pair of tape spools taken along the line 11—11 of FIG. 1.

Turning now to FIG. 11 in which tape-roll holder 23′ is illustrated in greater detail, there is shown vertical frame member 22 to which both holder 23 and holder 23′ are attached. In a similar manner, the holders for tape-positioning units C″ and C‴ are attached to a second vertical frame member 22′. As is most clearly disclosed in partial cross section, holder 23′ includes spindle 90, having tapped bore 91 secured onto stud 92 integral with frame member 22. Tape spool 26 comprises circular side plates 94 and 94′ which are secured to spacing hub 96 by threaded member 98 and between which is disposed tape 19. Spacing hub 96 includes bushing 97 of a size sufficient to be rotatably positioned over spindle 90. Flange 100 also includes circular opening 101 axially aligned to enable flange 100 to be positioned over spindle 90. Pin 102, inserted through aligned vertical bore 103 in flange 100 and bore 104 in spindle 90, attaches spool 26′ to holder 23′. Thus holder 23′ is arranged for quick assembly and disassembly to provide for easy replacement of spool 26′ while tape strips 19′ are being fed from spool 26.

When depleted spool 26 is replaced, the front end of tape 19 on the new spool is joined to the tail end of depleted spool 26, for example, with a piece of polyester tape. In this manner, when the tape spool 26′ in tape-positioning unit C′ subsequently becomes exhausted, energizing microswitch 72′ will deactivate solenoid 69 and cause the spring offset valving in pneumatic cylinder 68 to realign tape-positioning unit C with block 56 on runway 50 so as to continue an uninterrupted supply of tape as desired.

Referring again to FIG. 9, shaft 36 is attached through coupling 106 to variable speed gear box 108 which, in turn, is driven by motor 110 through pulleys 112 and 114 and belt 116. The setting of variable speed gear box 108 can be modified manually with adjusting means 118 to vary the rotational speed of shaft 36. In this manner, the length of tape strip 19′ positioned over block 56 will be controlled.

A fracturable pressure-sensitive tape which has been found especially suitable for use with the apparatus of this invention is manufactured by Minnesota Minning and Manufacturing Co. and identified as 3M #181A. The tape is approximately ¼″ wide with a continuous backing adhesive release strip adjacent to the adhesive. The spools of tape are wound with adhesive "in," each spool contains about 278 yards and since about 1¼″ of tape is used for each tab, one roll of tape will contain 8,000 single applications. Two rolls of tape will therefore tamperproof 8,000 jars with two tapes on each jar.

Although one embodiment of the invention has been particularly shown and described, it will be apparent that other adaptations and modifications can be made without departing from the true scope and spirit of the invention.

What is claimed is:

1. A device for the application of at least one segment of fracturable pressure-sensitive tape across the lid and body portion of a resealable container, comprising: a support having a surface defining a first path over which said container is caused to roll; means for advancing a tape segment transverse of and across said first path along a second path; and means for causing said container to roll along said first path over said tape segment, last said means further providing sufficient pressure to cause said segment to adhere to said container.

2. A device in accordance with claim 1 and further provided with means mounted on said support to cooperate with said lid to sever said tape segment at a predetermined location as said container rolls along said path.

3. A device in accordance with claim 1 wherein said tape advancing means comprises means for pulling a tape backing strip from said tape.

4. A device in accordance with claim 1 including means for positioning said tape which are complementary to at least a portion of the contour of said container.

5. A device in accordance with claim 1, wherein said tape advancing means includes apparatus for feeding a segment of tape including a backing strip across said first path, comprising: means transverse of said second path and adjacent said first path which define an edge for contacting the backing strip of said tape; means for drawing said backing strip against said edge and away from the direction of advancement of said tape at an obtuse angle thereto, whereby drawing said backing strip against said edge will cause said tape to be simultaneously separated from said backing strip and advanced over said first path.

6. Apparatus in accordance with claim 5 including means disposed between said edge and said first path for severing a segment of said tape.

7. Apparatus in accordance with claim 5 including means for advancing said tape across said first path comprising: a continuously rotating shaft having friction means thereon; and means for controllably compressing said backing strip against said shaft whereby when said backing strip is positioned over said shaft and said pressing means activated, said backing strip will be drawn around said edge thereby advancing said tape across said first path.

References Cited

UNITED STATES PATENTS

| | | | |
|---|---|---|---|
| 2,317,943 | 4/1943 | Salfisberg | 156—486 |
| 2,343,148 | 2/1944 | Klug | 156—212 X |
| 2,363,277 | 11/1944 | Anderson | 156—483 X |
| 2,407,641 | 9/1946 | Anderson | 156—486 |
| 2,512,579 | 6/1950 | Long | 156—468 |
| 2,743,064 | 4/1956 | LeFebvre et al. | 242—55 |
| 3,077,919 | 2/1963 | Krueger | 156—584 |

HAROLD ANSHER, Primary Examiner

M. E. McCAMISH, Assistant Examiner

U.S. Cl. X.R.

156—506, 542